(12) United States Patent
Goodno et al.

(10) Patent No.: US 10,935,869 B2
(45) Date of Patent: Mar. 2, 2021

(54) COMMON DRIVE ELECTRO-OPTIC PHASE MODULATOR ARRAY

(71) Applicant: NORTHROP GRUMMAN SYSTEMS CORPORATION, Falls Church, VA (US)

(72) Inventors: Gregory D. Goodno, Los Angeles, CA (US); Eric C. Cheung, Rancho Palos Verdes, CA (US); Mark E. Weber, Hawthorne, CA (US)

(73) Assignee: NORTHROP GRUMMAN SYSTEMS CORPORATION, Falls Church, VA (US)

( * ) Notice: Subject to any disclaimer, the term of this patent is extended or adjusted under 35 U.S.C. 154(b) by 341 days.

(21) Appl. No.: 16/298,618

(22) Filed: Mar. 11, 2019

(65) Prior Publication Data
US 2020/0241383 A1 Jul. 30, 2020

Related U.S. Application Data

(60) Provisional application No. 62/693,083, filed on Jul. 2, 2018.

(51) Int. Cl.
*G02F 1/035* (2006.01)
*G02F 1/39* (2006.01)
(Continued)

(52) U.S. Cl.
CPC ............ *G02F 1/395* (2013.01); *G02F 1/0356* (2013.01); *H01S 3/06758* (2013.01);
(Continued)

(58) Field of Classification Search
CPC ...... G02F 1/035; G02F 1/395; G02F 2201/12; G02F 2202/20; G02F 1/0356; H01S 3/2391; H01S 3/06783
See application file for complete search history.

(56) References Cited

U.S. PATENT DOCUMENTS 5,886,807 A 3/1999 Cummings
6,069,729 A 5/2000 Gill et al.
(Continued)

FOREIGN PATENT DOCUMENTS

EP 0764376 A1 3/1997

OTHER PUBLICATIONS

PCT International Search Report of the International Searching Authority dated Oct. 8, 2019 and dated Oct. 21, 2019 for International Application No. PCT/US2019/040082 filed Jul. 1, 2019.
(Continued)

*Primary Examiner* — Jennifer Doan
(74) *Attorney, Agent, or Firm* — John A. Miller; Shumaker, Loop & Kendrick, LLP

(57) ABSTRACT

An electro-optical modulator (EOM) array that simultaneously modulates a plurality of optical beams. The EOM array has particular application for use in a seed beam source for an SBC fiber laser amplifier system, where the seed beam source includes a plurality of master oscillators each providing an optical seed beam at a different wavelength on a fiber. The EOM array has a common substrate, a plurality of parallel waveguides and an electrode structure, where each waveguide is coupled to one of the fibers to receive one of the seed beams. An RF source provides an RF drive signal to the electrode structure that modulates the seed beams. The fiber laser amplifier system amplifies each of the seed beams from the EOM array, and includes an SBC grating that spatially combines the amplified beams at the different wavelengths so that they are directed in the same direction as an output beam.

20 Claims, 3 Drawing Sheets

(51) Int. Cl.
*H01S 3/067* (2006.01)
*H01S 3/23* (2006.01)
(52) U.S. Cl.
CPC ........ *H01S 3/06783* (2013.01); *H01S 3/2391* (2013.01); *G02F 2201/12* (2013.01); *G02F 2202/20* (2013.01)

(56) References Cited

U.S. PATENT DOCUMENTS

| | | | |
|---|---|---|---|
| 8,426,798 B2 * | 4/2013 | Higgins | G02F 1/0516 |
| | | | 250/214 C |
| 9,874,800 B2 * | 1/2018 | Nagarajan | G02F 1/2257 |
| 10,008,821 B1 | 6/2018 | Goodno et al. | |
| 2003/0118267 A1 | 6/2003 | Kimber et al. | |
| 2010/0290732 A1 | 11/2010 | Gill | |

OTHER PUBLICATIONS

Goodno, Gregory D. and Rothenberg, Joshua E.; Utility application U.S. Appl. No. 15/942,240 titled "Spectrally Compensated Fiber Amplifier System" filed Mar. 30, 2018.

\* cited by examiner

COMMON DRIVE ELECTRO-OPTIC PHASE MODULATOR ARRAY

CROSS-REFERENCE TO RELATED APPLICATIONS

This application claims the benefit of the filing date of U.S. Provisional Patent Application No. 62/693,083 filed Jul. 2, 2018, and titled Common Drive Electro-Optic Phase Modulator Array.

BACKGROUND

Field

This disclosure relates generally to an electro-optical modulator (EOM) array that simultaneously modulates a plurality of optical beams and, more particularly, to an EOM array that has application for use in a seed beam source for a spectral beam combining (SBC) fiber laser amplifier system, where the seed beam source includes a plurality of master oscillators each providing an optical seed beam at a different wavelength, and where the EOM array includes a common substrate, a plurality of parallel waveguides each receiving one of the seed beams, and an electrode structure that receives an RF drive signal that modulates the seed beams as they propagate along the waveguides.

Discussion

High power laser amplifiers have many applications, including industrial, commercial, military, etc. Designers of laser amplifiers are continuously investigating ways to increase the power of the laser amplifier for these and other applications. One known type of laser amplifier is a fiber laser amplifier that employs a doped fiber that receives a seed beam and a pump beam that amplifies the seed beam and generates the high power laser beam, where the fiber has an active core diameter of about 10-20 µm or larger. Fiber laser amplifiers are useful as energy sources for directed energy weapons because of their high efficiency, high power scalability and excellent beam quality.

Improvements in fiber laser amplifier designs have increased the output power of the fiber amplifier to approach its practical power and beam quality limit. To further increase the output power some fiber laser systems employ multiple fiber laser amplifiers that combine the amplified beams in some fashion to generate higher powers. A design challenge for fiber laser amplifier systems of this type is to combine the beams from a plurality of fiber amplifiers in a manner so that the beams provide a single beam output having a uniform phase over the beam diameter such that the beam can be focused to a small focal spot. Focusing the combined beam to a small spot at a long distance (far-field) defines the quality of the beam.

In one multiple fiber laser amplifier design known as spectral beam combining (SBC), a plurality of master oscillators (MOs) generate a plurality of fiber seed beams at different wavelengths, where each fiber seed beam is amplified. The amplified fiber seed beams are then directed to a diffraction grating, or other wavelength-selective element, that combines the different wavelength fiber beams into a single output beam. The diffraction grating has a periodic structure formed into the element so that when the individual fiber beams each having a slightly different wavelength and angular direction are redirected by the periodic structure all of the beams diffract from the diffraction grating in the same direction. However, limitations on spectral brightness of the underlying fiber lasers limit the number of seed beams that can be wavelength-combined with good beam quality, thus limiting the output power of the spectrally beam combined output laser beam.

SBC is a one method for scaling laser sources to weapons-class brightness, for example, greater than the 100 kW level. As mentioned, SBC laser weapons systems typically employ a dispersive optic, such as a diffraction grating, that combines beams from multiple high power laser channels, such as Yb-doped fiber amplifiers (YFDAs), although any laser elements can be used. Because of the limited gain bandwidth of the lasing gain medium (e.g. ~40 nm accessible gain bandwidth for YDFAs), the laser beam source channels must be configured to provide high spectral brightness (kW/nm) in order to scale an SBC system to high power while maintaining good combined beam quality, which due to angular dispersion from the grating will be degraded if the channel linewidths are not relatively narrow.

In order to achieve high spectral brightness from a YDFA, it is necessary to seed the amplifier with low power, narrow linewidth light. However, two nonlinear impairments in the YDFA constrain the seed beam characteristics. First, stimulated Brillouin scattering (SBS) requires that the seed beam linewidth be broadened to decrease its coherence length, and thus increase the SBS power threshold. Second, the Kerr nonlinearity imposes a requirement that the seed beam exhibit low relative intensity noise (RIN) to prevent unwanted nonlinear spectral broadening via self-phase modulation (SPM) or cross-phase modulation (XPM) in the YDFA.

These two nonlinear impairments typically require an SBC system architecture having a plurality of channels, where each laser channel includes a low power master oscillator front end assembly (MOFEA) and a high power YDFA (or chain of YDFAs), whose output beams are combined using beam combining optics into a single beam. Each MOFEA includes a master oscillator (MO) that typically is a single-longitudinal mode distributed feedback (DFB) diode laser oscillator that is followed by an electro-optic modulator (EOM). The EOM changes the phase of the seed beam proportionally to an applied voltage. By applying a radio frequency (RF) source with high power to the EOM, the output beam will have its linewidth substantially broadened compared to the input seed beam. Typical values for linewidth broadening suitable to seed kW-class YDFAs without SBS impairments are on the order of ~10 GHz/kW. The linewidth-broadened seed beam will ideally exhibit zero RIN, since only its phase is modulated and not its amplitude. This prevents spectral broadening, and consequent loss of beam quality of the combined SBC beam, by avoiding SPM or XPM in the YDFA.

For air and land platforms in particular, the size, weight and power (SWaP) of the fiber laser system is a major factor limiting deployment and use. In particular, the MOFEA suffers from a high part count and consequent high cost. While there is certainly opportunity for more compact packaging and routing of components, the requirement for parallel high power RF sources and EOMs for the multiple channels is a significant contributor to both SWaP and the cost of the MOFEA. There is a need for architectural and component improvements that would enable a reduction in the SWaP and cost of MOFEAs used for SBC laser beam sources.

In one known EOM, a beam is fiber coupled into an optical waveguide written into a $LiNbO_3$ chip. Electrodes are deposited on the chip so that the fringing field extends through the bulk of the waveguide, causing a change in phase via the electro-optic effect. For low frequency modulators, the electrodes are simply lumped elements, i.e., capacitively coupled. For high frequency modulators, the electrodes are designed to form a transmission line that is velocity-matched to the optical waveguide. Depending on the RF modulation scheme selected for linewidth-broadening, either type may be utilized in an SBC system. For example, broadening using a low-frequency, GHz-class noise source may not require use of a transmission line configuration, while broadening using a structured digital pseudo-random bit sequence (PRBS) at high frequency (10 s of GHz) requires a velocity-matched transmission line configuration.

EOMs have also been commercially produced in array packages of multiple independent optical channels, where eight channels is standard, and up to sixteen channels has been demonstrated, and where the number of channels is limited primarily by the fiber coupling. Each independent optical channel in the EOM includes a corresponding electrically independent RF drive input and electrodes that are integrated onto the same substrate and co-packaged.

SUMMARY

The present disclosure discusses and describes an EOM array that simultaneously modulates a plurality of optical beams. The EOM array has particular application for use in a seed beam source for an SBC fiber laser amplifier system, where the seed beam source includes a plurality of master oscillators each providing an optical seed beam at a different wavelength on a fiber. The EOM array has a common substrate, a plurality of parallel waveguides and an electrode structure, where each waveguide is coupled to one of the fibers to receive one of the seed beams. An RF source provides an RF drive signal to the electrode structure that modulates the seed beams. The fiber laser amplifier system includes a separate fiber amplifier that amplifies each of the seed beams modulated by the EOM array, an emitter array responsive to all of the amplified beams that directs the amplified beams into free space as diverging uncombined beams, beam collimating optics responsive to the diverging uncombined beams that focuses the diverging uncombined beams as collimated uncombined beams, and an SBC grating responsive to the collimated uncombined beams that spatially combines the collimated uncombined beams so that all of the amplified beams at the different wavelengths are directed in the same direction as an output beam.

Additional features of the disclosure will become apparent from the following description and appended claims, taken in conjunction with the accompanying drawings.

DETAILED DESCRIPTION OF THE EMBODIMENTS

The following discussion of the embodiments of the disclosure directed to an electro-optical modulator (EOM) array that simultaneously modulates a plurality of optical beams, where the EOM array includes a common substrate, a plurality of parallel waveguides and an electrode structure, is merely exemplary in nature, and is in no way intended to limit the disclosure or its applications or uses. For example, the EOM array has particular application in a seed beam source for an SBC fiber laser amplifier system. However, as will be appreciated by those skilled in the art, the EOM array may have application for other optical systems.

Figure 1:
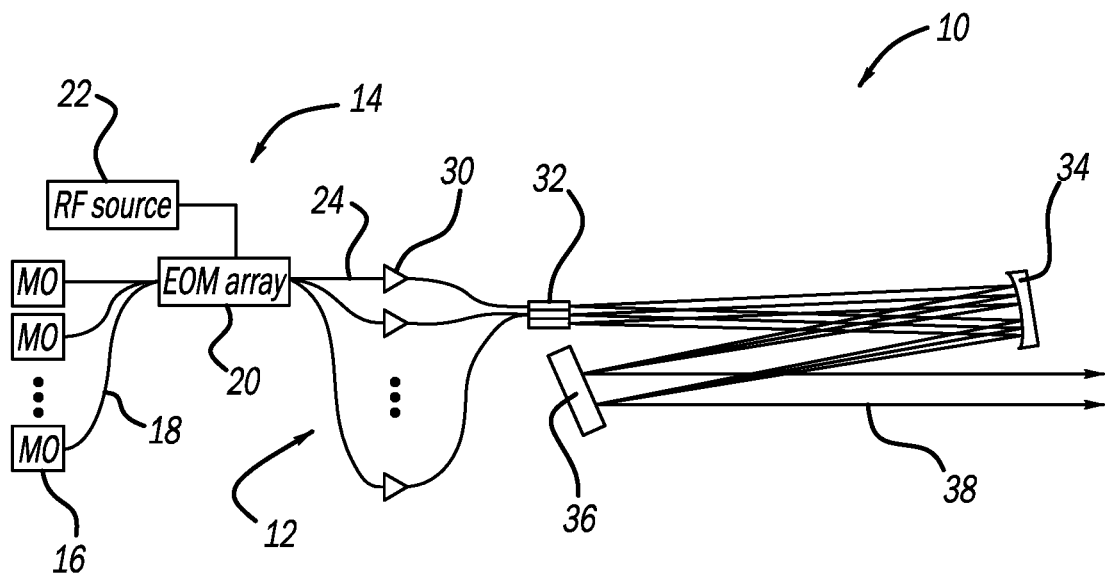
FIG. 1 is a schematic block diagram of an SBC fiber laser amplifying system that includes a seed beam source having a plurality of master oscillators and an EOM array.

FIG. 1 is a schematic block diagram of an SBC fiber laser amplifier system 10 that includes N number of wavelength channels 12 and a seed beam source 14 that includes N number of master oscillators (MO) 16 that each generates a continuous wave single frequency seed beam having wavelength on a fiber 18 for the particular channel 12, where each seed beam source 14 generates a different beam wavelength $\lambda_1$-$\lambda_N$. In one embodiment, the MOs 16 can be a single-longitudinal mode distributed feedback (DFB) diode laser oscillator. The seed beams on the fibers 18 are sent to a multiple channel EOM array 20 that changes the phase of the seed beams to be proportional to an applied voltage provided by an amplified radio frequency (RF) electrical drive signal from an RF source 22. The EOM array 20 provides frequency modulation broadening, such as white noise or pseudo-random bit sequence (PRBS), so that the modulated seed beam for each channel 12 provided on fibers 24 has a linewidth that is substantially broadened compared to the seed beam on the fibers 18, which suppresses stimulated Brillouin scattering in a downstream high power fiber amplifier. As will be discussed below, the EOM array 20 includes multiple independent waveguides, where each waveguide receives one of the seed beams, and where all of the waveguides are driven by the RF source 22. The seed beam sources in the known SBC fiber laser amplifier systems required a separate EOM and drive source for each channel.

Each of the seed beams on the fibers 24 is sent to a fiber amplifier 30, such as a Yb-doped fiber amplifier, where the amplifier 30 will typically be a doped amplifying portion of the fiber 24 that receives an optical pump beam (not shown). All of the amplified beams are directed to an optical emitter array 32 that outputs a set of diverging amplified beams into free space, where the individual beam wavelengths $\lambda_1$-$\lambda_N$ are propagating from slightly different emitter positions. The diverging beams are reflected off of collimating optics 34 that collimates the diverging beams and directs them onto an SBC grating 36 so that all of the individual beams impact the grating 36 and overlap on the same footprint. The grating 36 spatially diffracts the individual beam wavelengths $\lambda$ and directs the individual amplified beams in the same direction as a combined output beam 38.

Figure 2:
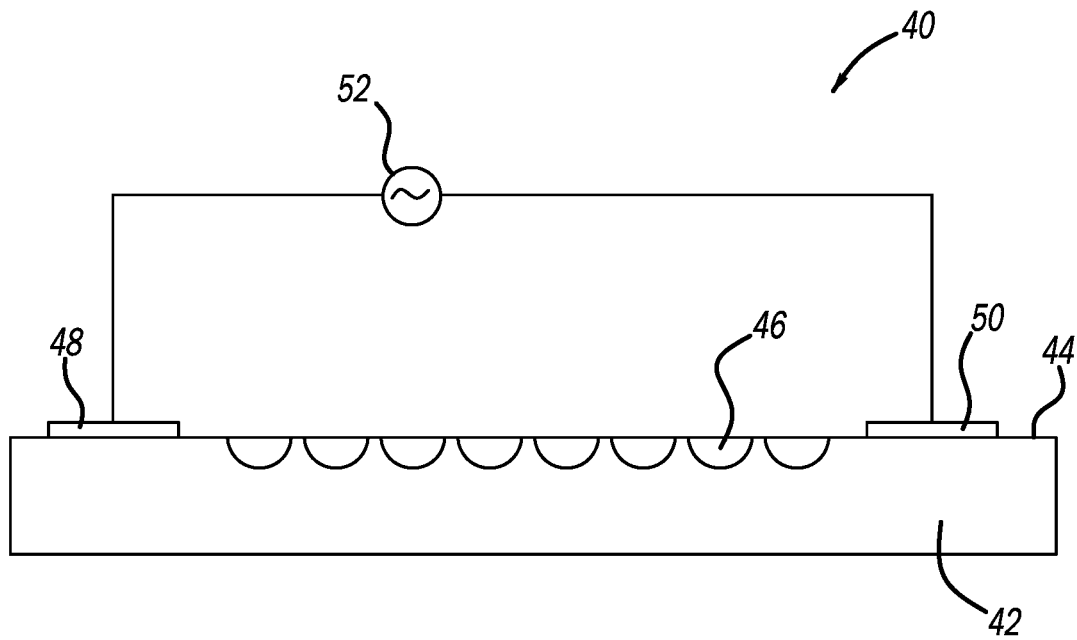
FIG. 2 is an end view of an EOM array that can be used for the EOM array shown in FIG. 1, where the EOM array includes a plurality of waveguides and one set of common RF electrodes.

FIG. 2 is an end view of an EOM array 40 that can be used as the EOM array 20. The array 40 includes a substrate 42, such as a LiNbO₃ substrate, having a top surface 44 into which a plurality of parallel waveguides 46 are formed, where each waveguide 46 receives a different one of the seed beams on a separate fiber 18 from the MOs 16 and operates as a separate EOM. In this non-limiting embodiment, the waveguides 46 are U-shaped and are formed as a doped region of the substrate 42, for example, with titanium (Ti), so that the waveguides 46 have a higher index of refraction than the rest of the substrate 42. A first stripline electrode 48 is deposited or formed on the top surface 44 of the substrate 42 adjacent to one side of the waveguides 46 and a second stripline electrode 50 is deposited or formed on the top surface 44 of the substrate 42 adjacent to the opposite side of the waveguides 46, where the electrodes 48 and 50 receive an RF drive signal from an RF source 52. Thus, a common RF drive source, specifically the RF source 52, is used for the entire array 40, as compared to having distinct and independent RF inputs for each waveguide as was done in the known fiber laser amplifier systems. The waveguides 46 are configured so that the optical phase shift arising from the RF field applied across each waveguide 46 using a common RF input is similar, but not necessarily identical.

Figure 3:
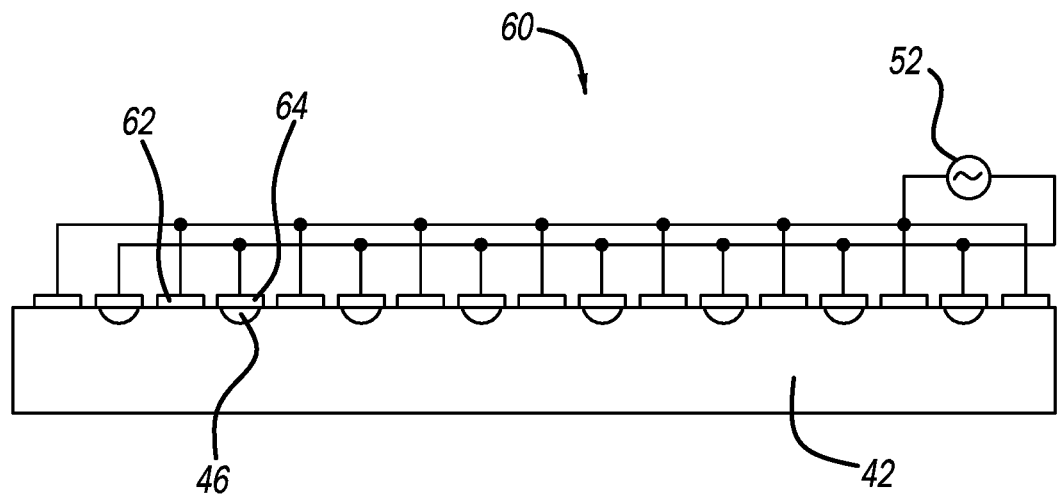
FIG. 3 is an end view of an EOM array that can be used for the EOM array shown in FIG. 1, where the array includes a plurality of waveguides and an RF electrode structure split and distributed to multiple parallel, common electrodes.

FIG. 3 is an end view of an EOM array 60 that can also be used as the EOM array 20, where like elements to the array 40 are identified by the same reference number. In this embodiment, the electrodes 48 and 50 are replaced with a common electrode structure including multiple parallel stripline electrodes 62 positioned between the waveguides 46 and multiple parallel stripline electrodes 64 positioned over the waveguides 46. The RF drive signal from the source 52 is split and distributed to the electrodes 62 and 64, where one output terminal of the source 52 is electrically coupled to the electrodes 62 and the other output terminal of the source 52 is electrically coupled to the electrodes 64 as shown. This embodiment may be advantageous for reduced drive voltages by configuring the EOM array 60 in the so-called 'z-cut' geometry. Numerous other embodiments may also be useful with different geometric arrangements of the electrodes and waveguides, but sharing the common feature that the optical phase of each waveguide channel is actuated by the same common RF input source.

For some EOM array implementations it may be important to ensure that the EOM array 20 is impedance matched to the RF source 22 so that it does not introduce significant electrical reflections or resonances that could either damage the RF source 22 or distort the optical spectrum of the phase modulated optical seed beams. This is particularly important when the RF source 22 is configured to provide a high frequency PRBS waveform, since the RF spectral components must be accurately imprinted on the optical phases of the seed beams transmitted through the waveguides 46.

Figure 4:
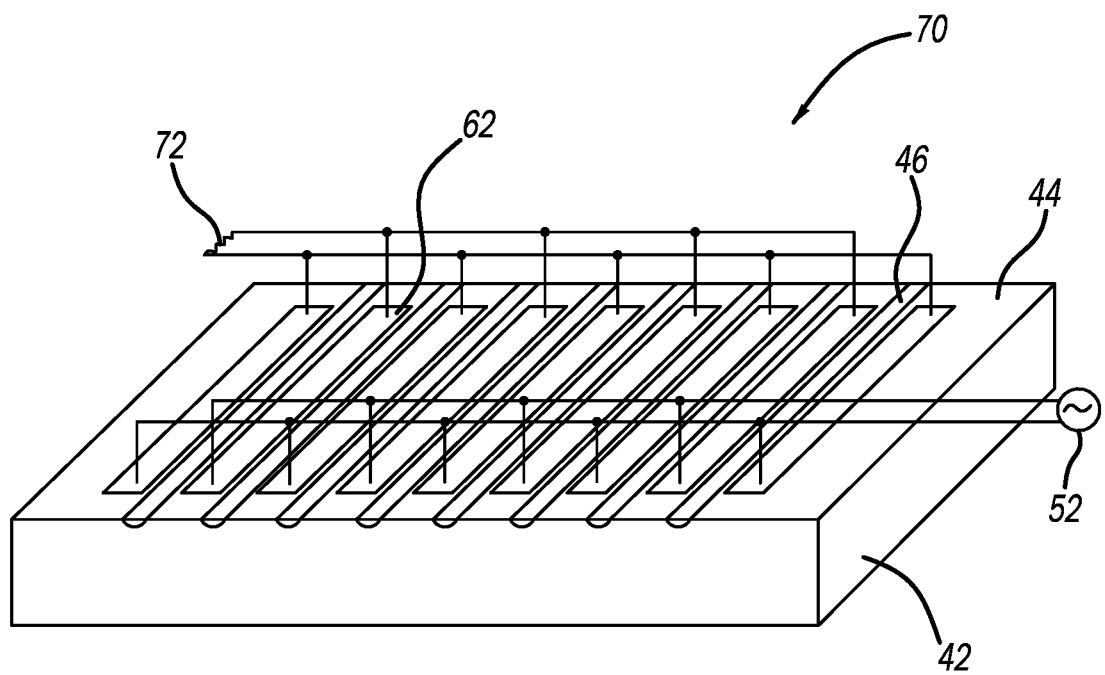
FIG. 4 is an isometric view of an EOM array that can be used for the EOM array shown in FIG. 1, where the array includes a plurality of waveguides and an RF electrode structure split and distributed to multiple parallel, common electrodes and including an impedance matching resistor.

FIG. 4 is an isometric view of an EOM array 70 that can also be used as the EOM array 20, where like elements to the EOM array 40 are identified by the same reference number, and where electrical features needed to ensure impedance matching are provided. The impedance Z of the RF drive signal from the source 52 is matched with an equal impedance output termination resistor 72 at the output end of the EOM array 70, as shown. The output terminals of the source 52 are alternately coupled to one end of the electrodes 62 and opposite ends of the termination resistor 72 are alternately electrically coupled to the other end of the electrodes 62, as shown. Each of the M number of parallel stripline electrodes 62 is designed to provide an impedance of M*Z to match the impedance Z of the RF drive signal from the source 52 and the termination resistor 72. Typically, the electrodes would be designed to constrain length variations between the stripline electrodes to a small fraction, such as 10%, of the smallest RF drive wavelength so that for driving with a few GHz source, the stripline electrodes would be length-matched to within a few mm.

One potential concern with using a common drive EOM array as an SBC seed beam source is the relative optical isolation, or crosstalk, between the channels. If even a small fraction of the optical power from one channel couples into any of the other channels, it will cause beating, i.e., relative intensity noise (RIN) at the difference frequency between the two wavelengths. This RIN can then drive nonlinear self-phase modulation (SPM) that will shift some power from the main wavelength channel into optical sidebands located at +/− the difference frequency. If the difference in frequency (i.e. the difference in wavelength) between the two channels is large, then dispersion will prevent large nonlinear power loss from the main wavelength, but if the difference between wavelengths is small, e.g. 0.25 nm, then substantial power can be shifted into the wrong wavelengths. This shifted power will essentially be lost in the SBC output beam since it will be diffracted into an angle far away from the main beam. Hence, it is important that the EOM array exhibit low crosstalk between channels, e.g. ~40 dB or less.

By using an EOM array containing M waveguide channels in an SBC fiber laser amplifier system with N amplification channels, N(M−1)/M duplicate sets of single channel EOMs and RF sources can be eliminated from the system, with a consequent SWaP and cost savings. Thus, it may be beneficial to modularize the seed beam source into N/M groups of M channels each to seed a set of N high power channels. Modularizing the seed beam source decouples the seed source component powers from the ultimate channel count for the N channel system. The module size M can be selected independently of the system channel count N. This flexibility enables use of lower power components in the seed beam source. It also is easier to manufacture low channel count M number of EOM arrays than high channel count N number of EOM arrays.

Figure 5:
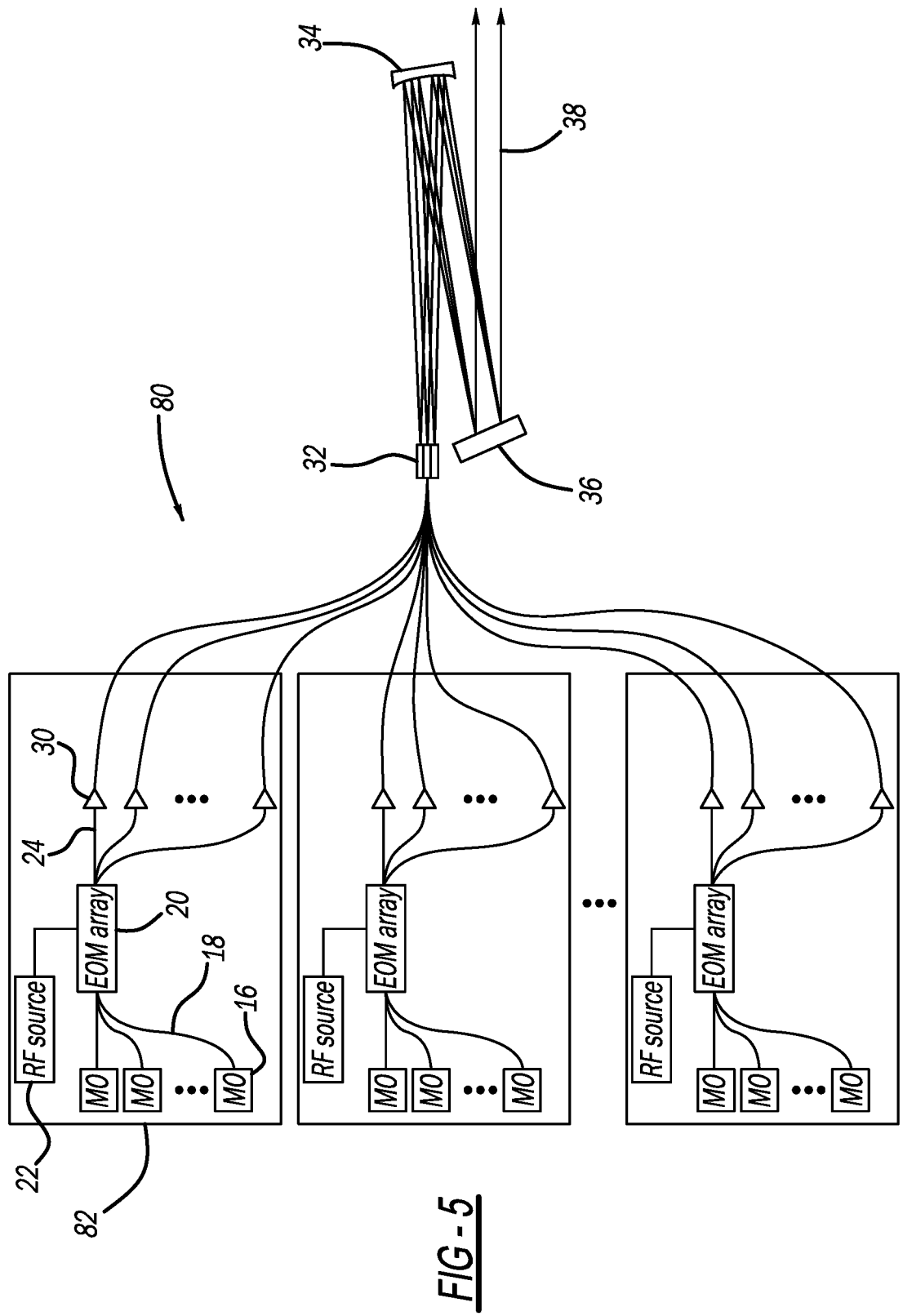
FIG. 5 is a schematic block diagram of an SBC fiber laser amplifying system that includes a plurality of modularized seed beam sources each having a plurality of master oscillators and an EOM array in the same manner as the seed beam source in FIG. 1.

FIG. 5 is a schematic block diagram of an SBC fiber laser amplifier system 80 illustrating the modular seed beam source approach referred to above, where like elements to the fiber laser amplifier system 10 are identified by the same reference number. The system 80 includes N/M number of wavelength group modules 82 each including M number of MOs 16 operating at different wavelengths as discussed above.

The foregoing discussion discloses and describes merely exemplary embodiments of the present disclosure. One skilled in the art will readily recognize from such discussion and from the accompanying drawings and claims that various changes, modifications and variations can be made therein without departing from the spirit and scope of the disclosure as defined in the following claims.

What is claimed is:

1. An optical beam modulation system for simultaneously modulating a plurality of optical beams, where each optical beam has a different wavelength, said modulation system comprising:
    an electro-optical modulator (EOM) array including a common substrate having a top surface and a plurality of more than two parallel waveguides formed into the top surface, where each waveguide receives one of the optical beams at the different wavelengths, said EOM array further including an electrode structure formed to the top surface; and a single RF source providing an RF drive signal to the electrode structure that modulates the optical beams propagating on the waveguides.

2. The modulation system according to claim 1 wherein the waveguides are U-shaped waveguides.

3. The modulation system according to claim 1 wherein the electrode structure includes a plurality of parallel stripline electrodes.

4. The modulation system according to claim 3 wherein the electrode structure includes a first electrode provided on one side of the parallel waveguides and a second electrode provided on an opposite side of the parallel waveguides.

5. The modulation system according to claim 3 wherein the electrode structure includes a plurality of parallel electrodes provided between and on top of the parallel waveguides.

6. The modulation system according to claim 5 wherein where one output terminal of the single RF source is electrically coupled to the electrodes between the parallel electrodes and another output terminal of the single RF source is electrically coupled to the electrodes on top of the waveguides.

7. The modulation system according to claim 3 wherein the electrode structure includes a plurality of parallel electrodes provided between the parallel waveguides.

8. The modulation system according to claim 1 wherein the electrode structure includes a termination resistor that provides impedance matching between the RF source and the electrode structure.

9. The modulation system according to claim 1 wherein the common substrate is a $LiNbO_3$ substrate.

10. The modulation system according to claim 9 wherein the waveguides are titanium doped portions of the substrate.

11. The modulation system according to claim 1 wherein the modulation system is part of a seed beam source in a spectral beam combining (SBC) fiber laser amplifier system where the optical beams are seed beams.

12. The modulation system according to claim 11 wherein the seed beam source includes a plurality of master oscillators each providing one of the seed beams at the different wavelength on a separate fiber, and wherein the fiber laser amplifier system includes a plurality of separate fiber amplifiers that amplify each of the seed beams from each of the waveguides, an emitter array responsive to all of the amplified beams that directs the amplified beams into free space as diverging uncombined beams, beam collimating optics responsive to the diverging uncombined beams that focuses the diverging uncombined beams as collimated uncombined beams, and a SBC grating responsive to the collimated uncombined beams that spatially combines the collimated uncombined beams so that all of the amplified beams at the different wavelengths are directed in the same direction as an output beam.

13. The modulation system according to claim 12 wherein the plurality of master oscillators, the EOM array and the single RF source are configured as a first seed beam source module in the fiber amplifier system, said fiber amplifier system including a plurality of seed beam source modules each having a plurality of master oscillators, an EOM array and an RF drive source, wherein all of the master oscillators in all of the seed beam source modules operate at the different wavelengths.

14. An electro-optical phase modulator (EOM) array for modulating a plurality of optical beams each having a different wavelength, said EOM array comprising a common substrate having a top surface and a plurality of more than two parallel waveguides formed into the top surface each receiving a separate one of the beams at the different wavelengths, and a plurality of parallel stripline electrodes formed to the top surface, said electrodes being responsive to a single RF drive signal that modulates the beams propagating on the waveguides.

15. The EOM array according to claim 14 wherein the plurality of parallel electrodes includes a first electrode provided on one side of the parallel waveguides and a second electrode provided on an opposite side of the parallel waveguides.

16. The EOM array according to claim 14 wherein the plurality of parallel electrodes includes a plurality of parallel electrodes provided between and on top of the parallel waveguides.

17. The EOM array according to claim 14 wherein the plurality of parallel electrodes includes a plurality of parallel electrodes provided between the parallel waveguides.

18. A spectral beam combining (SBC) fiber laser amplifier system comprising:
a seed beam source including a plurality of more than two master oscillators each providing an optical seed beam at a different wavelength on a separate fiber, an electro-optical phase modulator (EOM) array including a common substrate having a top surface and a plurality of more than two parallel waveguides formed into the top surface, where each waveguide is coupled to one of the fibers to receive one of the seed beams, said EOM array further including an electrode structure formed to the top surface, and a single RF source providing an RF drive signal to the electrode structure that modulates the seed beams propagating on the waveguides;
a plurality of fiber amplifiers each amplifying the modulated seed beam from one of the waveguides;
an emitter array responsive to all of the amplified beams that directs the amplified beams into free space as diverging uncombined beams;
beam collimating optics responsive to the diverging uncombined beams that focuses the diverging uncombined beams as collimated uncombined beams; and
a SBC grating responsive to the collimated uncombined beams that spatially combines the collimated uncombined beams so that all of the amplified beams at the different wavelengths are directed in the same direction as an output beam.

19. The SBC fiber laser amplifier system according to claim 18 wherein the electrode structure includes a plurality of parallel stripline electrodes having a first electrode provided on one side of the parallel waveguides and a second electrode provided on an opposite side of the parallel waveguides.

20. The SBC fiber laser amplifier system according to claim 18 wherein the electrode structure includes a plurality of parallel stripline electrodes having parallel electrodes provided between and on top of the parallel waveguides.

* * * * *